United States Patent
Liu et al.

(10) Patent No.: US 10,135,565 B2
(45) Date of Patent: Nov. 20, 2018

(54) RECEPTION FAILURE FEEDBACK SCHEME IN WIRELESS LOCAL AREA NETWORKS

(71) Applicant: MEDIATEK Singapore Pte. Ltd., Singapore (SG)

(72) Inventors: Jianhan Liu, San Jose, CA (US); Chao-Chun Wang, Taipei (TW); Thomas Edward Pare, Jr., Mountain View, CA (US); YungPing Hsu, Taipei (TW)

(73) Assignee: MEDIATEK Singapore Pte. Ltd., Singapore (SG)

( * ) Notice: Subject to any disclaimer, the term of this patent is extended or adjusted under 35 U.S.C. 154(b) by 55 days.

(21) Appl. No.: 15/146,995

(22) Filed: May 5, 2016

(65) Prior Publication Data

US 2016/0248542 A1 Aug. 25, 2016

Related U.S. Application Data

(63) Continuation of application No. PCT/US2014/064189, filed on Nov. 5, 2014.

(60) Provisional application No. 61/900,609, filed on Nov. 6, 2013.

(51) Int. Cl.
*H04L 12/66* (2006.01)
*H04L 1/00* (2006.01)
*H04L 1/18* (2006.01)
*H04L 1/16* (2006.01)
*H04B 17/318* (2015.01)
*H04W 84/12* (2009.01)

(52) U.S. Cl.
CPC .......... *H04L 1/0036* (2013.01); *H04L 1/0026* (2013.01); *H04L 1/0027* (2013.01); *H04L 1/1607* (2013.01); *H04L 1/1854* (2013.01); *H04L 1/1864* (2013.01); *H04B 17/318* (2015.01); *H04L 1/0025* (2013.01); *H04W 84/12* (2013.01)

(58) Field of Classification Search
CPC ............................... H04W 84/12; H04L 12/66
See application file for complete search history.

(56) References Cited

U.S. PATENT DOCUMENTS

| | | | |
|---|---|---|---|
| 8,036,224 B2 * | 10/2011 | Axelsson | H04L 45/00 370/216 |
| 2004/0015308 A1 * | 1/2004 | Lee | H04B 7/01 702/75 |
| 2005/0249244 A1 | 11/2005 | McNamara et al. | 370/474 |

(Continued)

OTHER PUBLICATIONS

International Search Report and Written Opinion of International Search Authority for PCT/US14/64189 dated Mar. 20, 2015(11 pages).

(Continued)

*Primary Examiner* — Brandon M Renner
(74) *Attorney, Agent, or Firm* — Imperium Patent Works; Zheng Jin

(57) ABSTRACT

A novel feedback schemes are introduced to assistant link adaptation for re-transmissions and to improve the network throughput and efficiency. When reception failure is a type B failure, then a failure report (FR) frame is feedback from the destination STA to the source STA. In the failure report frame, link adaptation information and information on failure causes are included.

18 Claims, 5 Drawing Sheets

(56) References Cited

U.S. PATENT DOCUMENTS

| | | | |
|---|---|---|---|
| 2008/0175189 A1 | 7/2008 | Furrer et al. | 370/328 |
| 2008/0273454 A1 | 11/2008 | Malkamaki et al. | 370/216 |
| 2009/0040998 A1 | 2/2009 | Park | 370/345 |
| 2010/0251057 A1* | 9/2010 | Hoshino | H04L 1/0048 714/749 |
| 2011/0075620 A1 | 3/2011 | Jang et al. | 370/329 |
| 2012/0178393 A1* | 7/2012 | Kawai | H04J 11/0023 455/226.1 |
| 2012/0243523 A1 | 9/2012 | Liu et al. | 370/338 |
| 2012/0287915 A1 | 11/2012 | Cheong et al. | 370/338 |
| 2012/0314636 A1 | 12/2012 | Liu | 370/311 |
| 2013/0070718 A1* | 3/2013 | Lim | H04W 88/06 370/329 |
| 2013/0170345 A1* | 7/2013 | Merlin | H04W 28/065 370/230 |
| 2014/0293868 A1* | 10/2014 | Levanen | H04L 1/1607 370/328 |
| 2015/0029844 A1* | 1/2015 | Pathmasuntharam | H04W 28/22 370/230 |
| 2015/0249529 A1* | 9/2015 | Zheng | H04L 1/1685 370/336 |
| 2016/0088665 A1* | 3/2016 | Kim | H04W 76/021 370/329 |
| 2017/0230149 A1* | 8/2017 | Wang | H04L 1/1819 |

OTHER PUBLICATIONS

EPO, Search Report for the EP patent application 14860401.0 dated Apr. 7, 2017 (12 pages).

\* cited by examiner

RECEPTION FAILURE FEEDBACK SCHEME IN WIRELESS LOCAL AREA NETWORKS

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/US14/64189, with an international filing date of Nov. 5, 2014, which in turn claims priority from U.S. Provisional Application No. 61/900,609, filed on Nov. 6, 2013. This application is a continuation of International Application No. PCT/US14/64189, which claims priority from U.S. Provisional Application No. 61/900,609. International Application No. PCT/US14/64189 is pending as of the filing date of this application, and the United States is a designated state in International Application No. PCT/US14/64189. This application claims priority under 35 U.S.C. § 119 from U.S. Provisional Application No. 61/900,609, entitled "Reception Failure Feedback Schemes in Wireless Local Networks," filed on Nov. 6, 2013. The disclosure of each of the foregoing documents is incorporated herein by reference.

TECHNICAL FIELD

The disclosed embodiments relate generally to wireless network communications, and, more particularly, to reception failure feedback scheme in wireless local area networks.

BACKGROUND

In current wireless local area network (WLAN) based on IEEE 802.11 standards, re-transmission is an important scheme to provide reliable communication. Re-transmission or not relies on acknowledgment (ACK) protocol. Upon successful reception of a frame of a type that requires acknowledgment, the destination station (STA) is required to respond with an acknowledgment if the frame check sum (FCS) of the received frame is correct after a short inter-frame space (SIFS) time interval. This technique is known as positive acknowledgment (ACK). On the other hand, if a reception failure happens at the destination STA, it does not send any ACK back to the source STA. If the source STA does not receive an acknowledgment frame within a given time period, for example, an ACKTimeout interval, then the source STA shall attempt to retransmit the failed frame. In WLAN based on IEEE 802.11 standards, the ACKTimeout interval is generally with a value of (sSIFSTime+aSlot-Time+aPHY-RX-START-Delay) starting at the PHY-TX-END.confirm primitive.

FIG. 1 (prior art) illustrates a standard IEEE 802.11 ACK procedure in a wireless local area network 100. Wireless local area network 100 comprises a source station STA 101 and a destination station STA 102. At time t1, source STA 101 transmits a data packet 110 to destination STA 102. The destination STA 102 receives the entire data packet 110 at time t2, and decodes the data packet. If STA 102 decodes the received data packet 110 successfully, then the destination STA 102 sends an acknowledgement frame ACK 120 back to the source STA 101 at time t3. On the other hand, if a reception failure occurs and STA 102 cannot decode the received data packet 110 successfully, then the destination STA 102 does not send any ACK frame back to the source STA 101.

One problem of the aforementioned ACK scheme is that the source STA does not know causes of the failure transmission if no ACK is received. Therefore, the source STA does link adaptation blindly for subsequent retransmissions. One widely adopted scheme in re-transmissions is to use the lowest modulation and coding scheme (MCS). This scheme is too conservative and in most cases reduces the network efficiency. A solution is sought to assist link adaptation for re-transmission by the destination STA and improve the network throughput and efficiency.

SUMMARY

Current wireless local networks (WLANs) based on IEEE 802.11 do not have any feedback when data packets transmitted from the source station (STA) are not successfully received at the destination station. The widely adopted link adaption method for re-transmissions is to use the most conservative modulation and coding scheme (MCS). In this invention, novel feedback schemes are introduced to assistant the link adaptation for re-transmissions and therefore improve the network throughput and efficiency. When reception failure is a type-B failure, then a failure report (FR) frame is feedback from the destination STA to the source STA. In the failure report frame, link adaptation information and information on failure causes are included.

In a first embodiment, a destination STA receives a data packet transmitted from a source STA in a wireless local area network. The destination STA decodes the data packet that comprises one or more SIG fields and a data field. The destination STA transmits an ACK frame to the source STA if the decoding is successful. The destination STA transmits a failure report (FR) frame to the source STA if the SIG fields are successfully decoded while the data field is unsuccessfully decoded (e.g., type-B failure reception). The FR frame is a control frame that includes a feedback field for type-B failure reception.

The feedback field in the FR control frame may include various feedback information to assist the source STA for re-transmission. First, the feedback field can include an SNR of the transmitted data packet that encounters a type-B reception failure. Second, the feedback field can include a recommended MCS for next re-transmission. Third, the feedback field can include Doppler Effect/channel variation metric, such as the request of traveling pilots or mid-amble, channel variation metric, etc. Fourth, the feedback field can include other metrics related to reception failure such as a collision indication due to interference.

In another embodiment, a source STA transmits a data packet to a destination STA in a wireless local area network. The data packet comprises one or more SIG fields and a data field. The source STA receives a failure report (FR) frame from the destination STA if the SIG fields are successfully decoded while the data field is unsuccessfully decoded (e.g., type-B failure reception). The source STA re-transmits the data packet to the destination STA based on the content of the FR frame if a type-B failure reception occurs.

If the source STA receives FR frame that includes SNR and/or recommended MCS, it adjusts its link adaptation based on the SNR and/or recommended MCS when it re-transmits the data packet. By accurate link adaption, the network efficiency is improved since the most conservation link adaption is avoided. If the source STA receives FR frame that includes Doppler Effect/channel variation metric, it can apply traveling pilots/mid-amble, or it can adjust the MCS or adjust the packet length in the re-transmission based on the Doppler Effect/channel variation metric. If the source STA receives FR frame that includes collision indication, it can defer its re-transmission a little bit longer to reduce the probability of a second collision.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
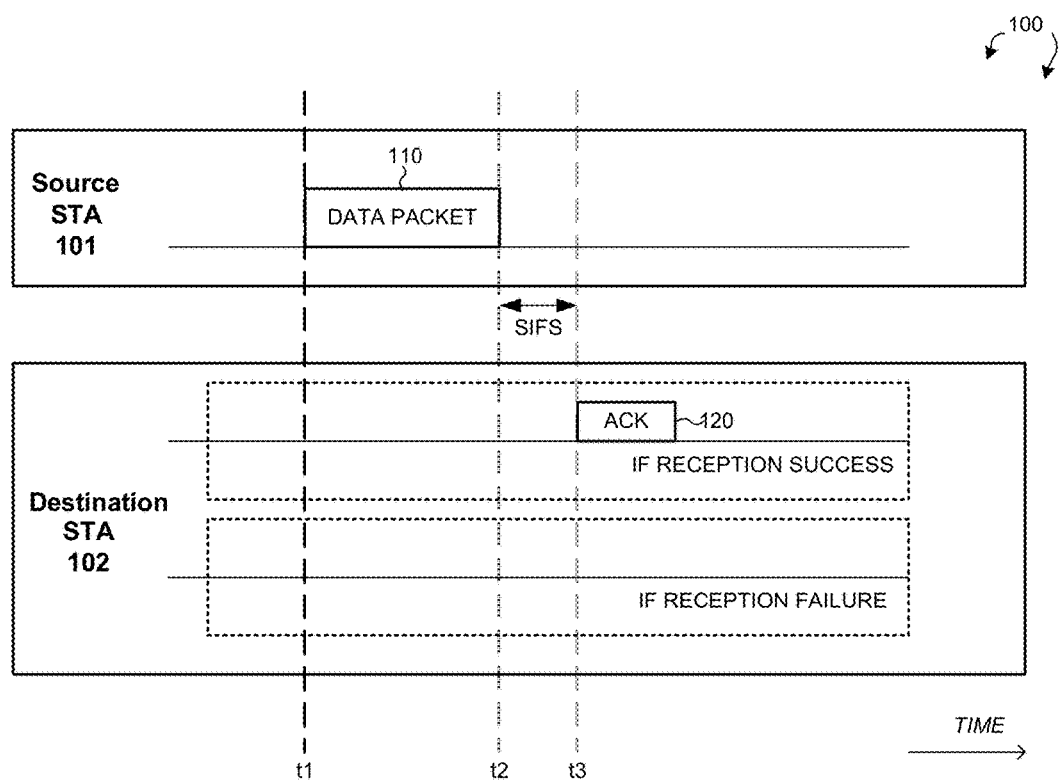
FIG. 1 (prior art) illustrates a standard IEEE 802.11 ACK procedure in a wireless system.
Figure 2:
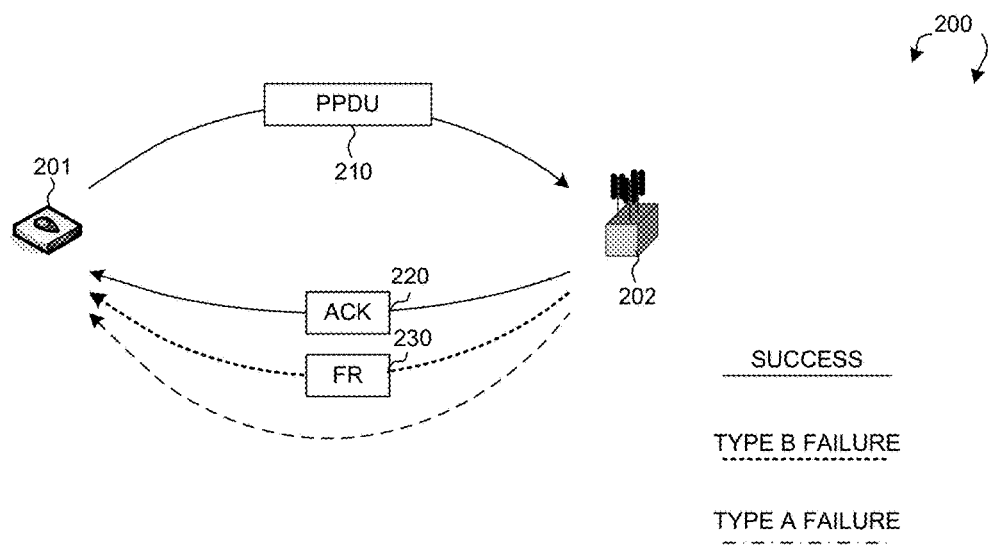
FIG. 2 illustrates a wireless local area network with reception failure feedback for data packets in accordance with one novel aspect.

FIG. 2 illustrates a wireless local area network (WLAN) 200 with reception failure feedback for data packets in accordance with one novel aspect. Wireless local area network 200 comprises a source station STA 201 that transmits data packets and a destination station STA 202 that receives data packets. The source STA 201 transmits an OFDM physical layer convergence procedure (PLCP) protocol data unit (PPDU) 210 in WLAN 200. The destination STA 202 receives PPDU 210 and tries to decode the PPDU. In accordance with one novel aspect, failure receptions are categorized into two types of failures, a first type-A failure reception and a second type-B failure reception respectively. If the reception is successful, STA 202 is then required to respond with a positive acknowledgment frame ACK 220 back to source STA 201. If type-B reception failure occurs, then STA 202 sends a Failure Report (FR) frame 230 back to source STA 201. If type-A reception failure occurs, then STA 202 does not send anything back to the source STA 201. If the source STA 201 receives the FR frame or does not receive any feedback within a given time period, then the source STA 201 will re-transmit PPDU 210 again. The Failure Report frame 230 provides feedback information from the destination STA to the source STA, which contains link adaptation information and information on failure causes. The FR frame thus can assist the source STA link adaptation for re-transmission and improve network throughput and efficiency.

Figure 3:
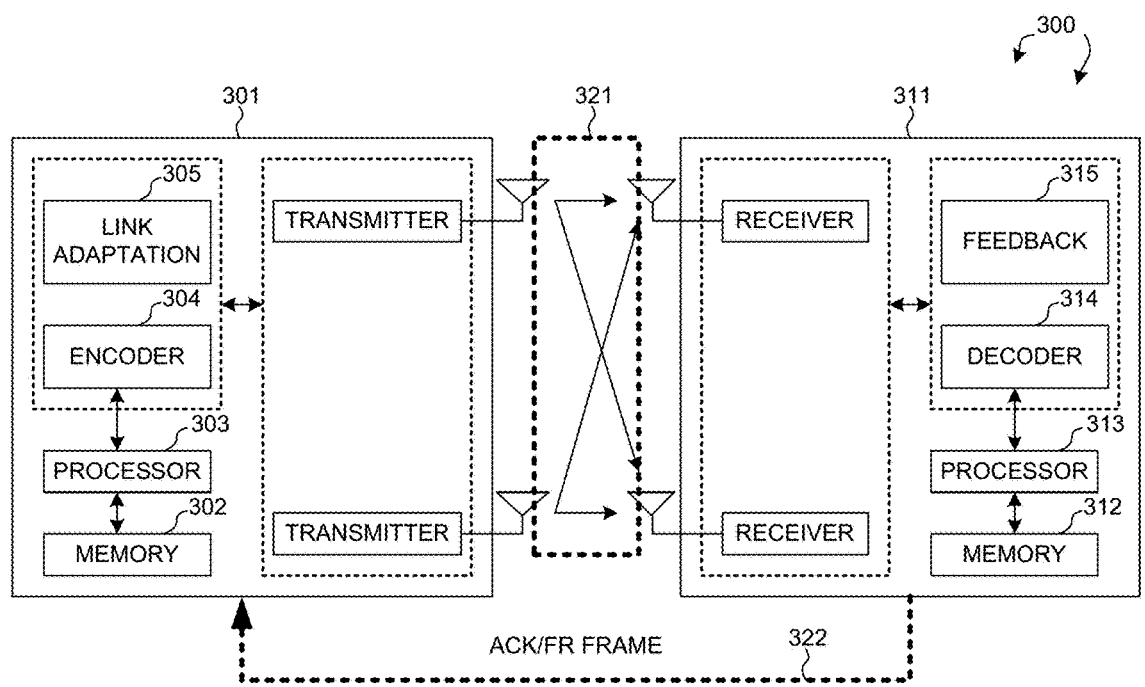
FIG. 3 illustrates simplified block diagrams of a source station and a destination station that carry out certain embodiments of the present invention.

FIG. 3 illustrates simplified block diagrams of a source station 301 and a destination station 311 that carry out certain embodiments of the present invention. In the example of FIG. 3, wireless system 300 comprises a source station STA 301 and a destination station STA 311 communicating with each other in OFDM radio frames via a wireless channel 321. Source STA 301 comprises memory 302, a processor 303, a channel encoder 304, a link adaptation module 305, and a plurality of transmitters coupled to a plurality of antennas, respectively. Destination STA 311 comprises memory 312, a processor 313, a channel decoder 314, a feedback module 315, and a plurality of receivers coupled to a plurality of antennas, respectively. The different modules are function modules that can be implemented by software, firmware, hardware, or any combination thereof. The function modules, when executed by the processors 303 and 313, allow STA 301 and STA 311 to perform various functions accordingly. For example, in the transmitting direction, the link adaptation module 305 determines a desired Modulation and Coding Scheme (MCS), and the encoder 304 encodes data packets to be transmitted via the wireless channel by STA 301. In the receiving direction, STA 311 receives data packets, the decoder 314 decodes the received data packets, and the feedback module 315 provides Failure Report frames back to STA 301 to assist link adaption for re-transmission in the case of type-B reception failure.

Figure 4:
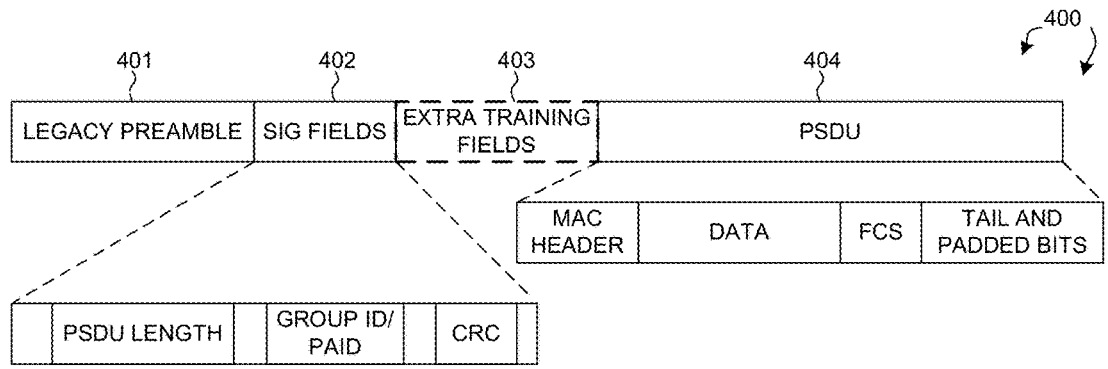
FIG. 4 illustrates an example of a physical layer convergence procedure (PLCP) protocol data unit (PPDU).

FIG. 4 illustrates an example of a physical layer convergence procedure (PLCP) protocol data unit (PPDU) 400. The PPDU 400 comprises either three or four segments, a legacy preamble 401, SIG fields 402, extra training fields 403 (depending on PPDU type), and PLCP service data unit (PSDU 404). The legacy preamble 401 is used for physical layer synchronization and channel estimation. The SIG fields 402 include the required information for demodulating and decoding the PSDU (e.g., Group ID/PAID), the duration of the PSDU (e.g., PSDU length) and parity check bits (e.g., CRC). The PSDU 404 contains a Media Access Control (MAC) header, a data portion, frame check sum (FCS) parity check, and a few tail and padded bits. PPDU 400 can also include extra training fields 403 between SIG fields 402 and PSDU 404. For example, high-throughput (HT) PPDU based on IEEE 802.11n standard and very-high-throughput (VHT) PPDU based on IEEE 802.11ac standard both include extra training fields.

Figure 5A:
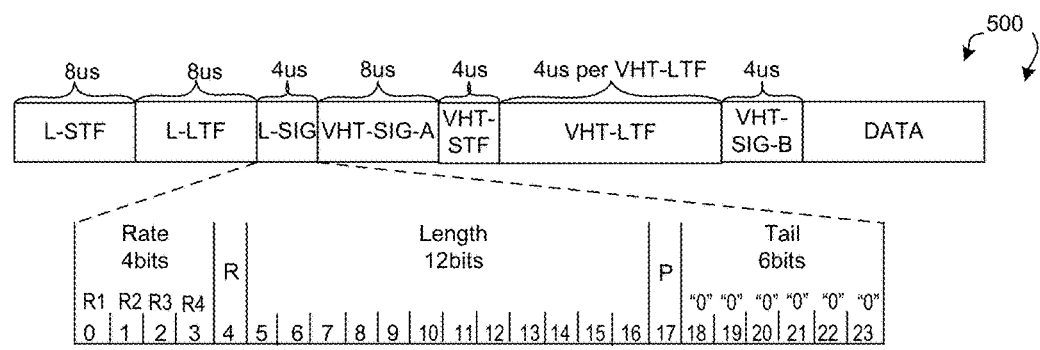
FIG. 5A illustrates an example of a VHT PPDU based on IEEE 802.11ac standard.

FIG. 5A illustrates an example of a VHT PPDU 500 based on IEEE 802.11ac standard. The VHT PPDU 500 comprises legacy short training field (L-SFT), legacy long training field (L-LTF), legacy SIG field (L-SIG), VHT-SIG-A field, VHT-STF field, VHT-LTF field, VHT-SIG-B field, and data field. Within the legacy preamble, the legacy SIG field L-SIG is included. In the L-SIG field, the length field is included. The length can be used to calculate the packet duration. Since the L-SIG field includes only one-bit parity check, HT-SIG, VHT-SIG, or future HE-SIG field needs to be decoded.

Figure 5B:
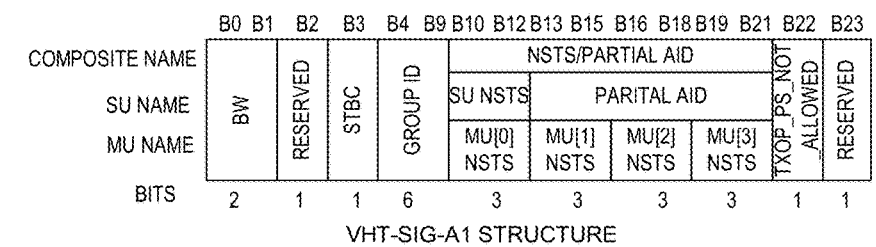
FIG. 5B illustrates an example of VHT-SIG fields of a VHT PPDU based on IEEE 802.11ac standard.
Figure 5B:
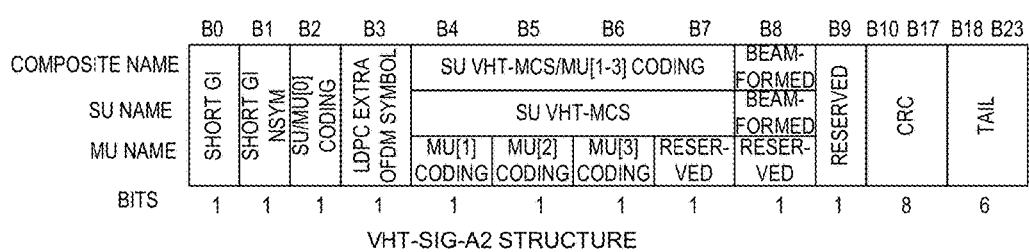

FIG. 5B illustrates an example of VHT-SIG fields of a VHT PPDU based on IEEE 802.11ac standard. The VHT-SIG fields include VHT-SIG-A1 and VHT-SIG-A2 SIG symbols. In VHT-SIG fields, Group ID, Partial AID, and CRC are included. Group ID/Partial AID can be used to identify the destination STA of the PPDU. CRC is used to make sure that all SIG fields (including L-SIG field) are correctly decoded.

According to IEEE 802.11, the PPDU sent by the source STA is designed with the following two features. First, the SIG fields in the PPDU sent by the source STA must include duration or length of the packet, parity check bits and partial AID. For example, in a VHT PPDU, length is included in the L-SIG, 8-bit parity check bits and partial AID are included in the VHT-SIG-A1 and VHT-SIG-A2. Second, the SIG fields are modulated and coded with the most reliable MCS scheme and the PSDU can be modulated by any MCS. For example, in a VHT PPDU, L-SIG and VHT-SIGs are modulated with BPSK and coded with ½ convolutional error correction code.

Based on such PPDU structure, failure receptions of the packet sent by the source STA can be categorized into two types of failures: a first type-A failure reception and a second type-B failure reception, respectively. Type-A failure reception occurs when the SIG fields have decoding error (e.g., SIG CRC check fails). This type of failure is mainly caused by preamble synchronization errors. Type-B failure reception occurs when the SIG fields are decoded correctly (e.g., SIG CRC check passes) but the PSDU has decoding error (e.g., PSDU FCS check fails). This type of failure is mainly due to the signal to noise ratio (SNR) is not high enough to support the MCS used in the PSDU. It is observed that most failure receptions are type-B failure receptions. However, the current WLAN-based IEEE 802.11 a/g/n/ac/ah standards do not separate the two types of decoding errors and there is no feedback to help the re-transmission for the source STA even for type-B failure receptions.

In accordance with one novel aspect, a new kind of feedback frame that is different from the ACK frame and block ACK frame defined in IEEE 802.11 a/g/n/ac/ah standards is introduced for type-B failure reception. This new kind of feedback frame is named as a Failure Report (FR) frame. The FR frame belongs to control frames and it is a new kind of control frame. The FR frame type is indicated by the type and subtype fields in the frame control field of the MAC header. The FR frame itself indicates that the transmitted data packet encounters a type-B reception failure.

Figure 6:
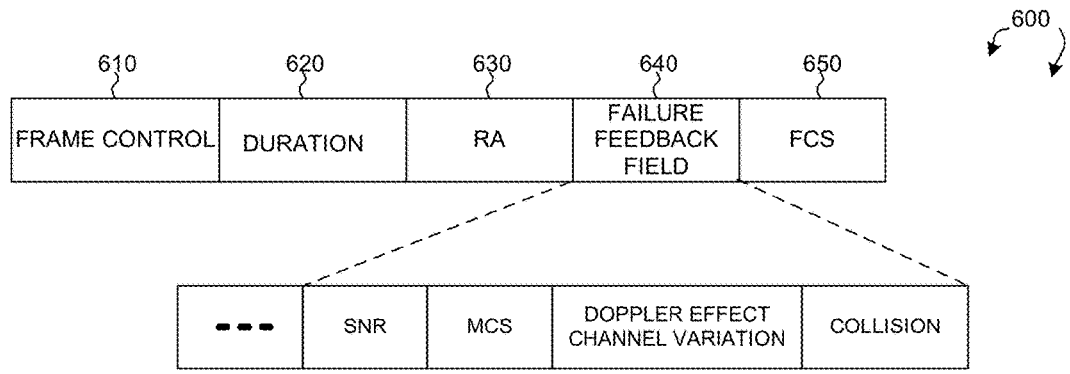
FIG. 6 illustrates one embodiment of a failure report (FR) frame used in type-B failure reception feedback for data packets.

FIG. 6 illustrates one embodiment of a failure report (FR) frame 600 used in reception failure feedback for data packets. FR frame 600 comprises a frame control field 610, a duration field 620, an RA field 630, a failure feedback field 640, and an FCS field 650. The FR control frame type is indicated by the type and subtype fields in the frame control field 610. The failure feedback field 640 may contain various information. First, the feedback field can include an SNR of the transmitted data packet that encounters a type-B reception failure. In one embodiment, the SNR is an average SNR over all subcarriers. In another embodiment, the wireless channel is a wide band channel that comprises a plurality of narrower band sub-channels. The SNR can be a list of SNRs of all the sub-channels. Second, the feedback field can include a recommended MCS for next re-transmission.

Third, the feedback field can include Doppler Effect/channel variation metric, such as the request of traveling pilots or mid-amble, channel variation metric, etc. In one embodiment, Doppler Effect/channel variation metric can be a one-bit indication, just indicating if the Doppler Effect exists or channel is time varying. In another embodiment, Doppler Effect/channel variation metric $M_H(\tau)$ can be an average channel variation for a given time period t.

$$M_H(\tau) = \sum_{k,m} \frac{\|\hat{H}(m+kT) - \hat{H}(m+kT+\tau T)\|^2}{\|\hat{H}(m+kT)\|^2}$$

Where
  m is the subcarrier index,
  T is the OFDM symbol duration with CP,
  k is the OFDM symbol index,
  t is the time period between two channel estimations,
  $\hat{H}(m+kT)$ is the channel estimation based on of pilots in the (m+kT)-th OFDM symbol.

Fourth, the feedback field can include other metrics related to reception failure. For example, if the source STA detects the strong interference during the decoding of PSDU, it can include collision indication into the FR frame. In one embodiment, the feedback field can be just one bit indicating whether the failure reception is caused by collision due to strong interference. One design of failure feedback field in the FR frame can be the link adaptation field defined in HT control field based on IEEE 802.11n standard or VHT control field based on IEEE 802.11ac standard.

Figure 7:
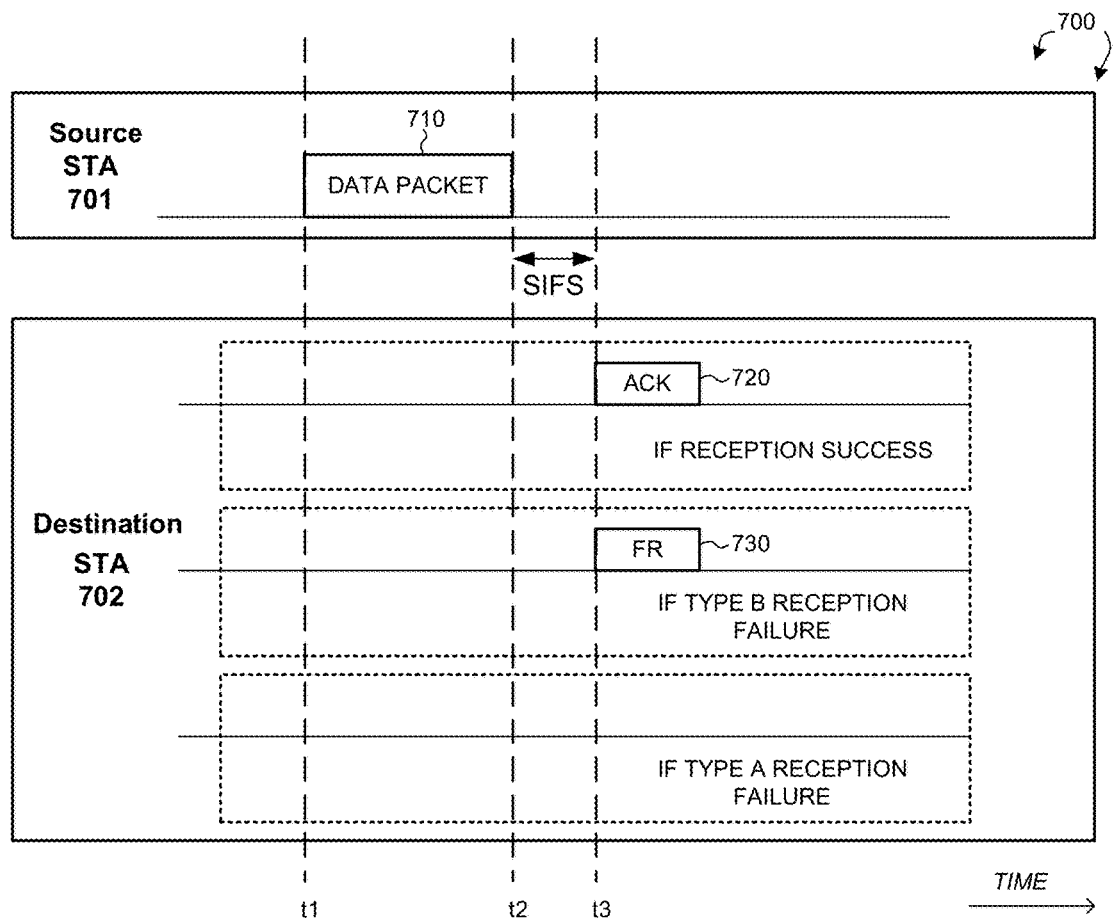
FIG. 7 illustrates an ACK procedure with failure reception feedback scheme for data packets.

FIG. 7 illustrates an ACK procedure with reception failure feedback scheme in a wireless local area network WLAN 700 in accordance with one novel aspect. Wireless local area network WLAN 700 comprises a source station STA 701 and a destination station STA 702. At time t1, source STA 701 transmits a data packet 710 to destination STA 702. The data packet 710 can be a PPDU data packet. The destination STA 702 receives the entire data packet 710 at time t2, and decodes the data packet. The length of the data packet is defined in the SIG fields of the PPDU, which can be used to calculate the packet duration (t2−t1). In a first scenario, if STA 702 decodes the received data packet 710 successfully, then the destination STA 702 sends an acknowledgement frame ACK 720 back to the source STA 701 at time t3 after an SIFS time interval. The time interval from t2 to t3 is equal to SIFS as defined by the IEEE 802.11 standards. In a second scenario, if type-B failure reception happens, then the destination STA 702 responds with an FR frame 730 back to the source STA 701 at time t3 after an SIFS time interval. In a third scenario, when type-A failure reception happens, then the destination STA 702 does not send any packet back to the source STA 701. To avoid multiple STAs to send back the FR frame, only the destination STA that matches the PAID and/or STA address should send back the FR frame for feedback. Note that when type-A failure occurs, the destination STA cannot decode the SIG fields correctly and therefore does not know the length of the packet. As a result, the destination STA cannot calculate the duration of the packet and does not know the exact timing for sending any feedback packet to the source STA. In addition, the PAID is also carried by the SIG fields, so when type-A failure occurs, the destination STA cannot decode the SIG fields correctly and therefore does not know whether it should send any feedback packet to the source STA.

Figure 8:
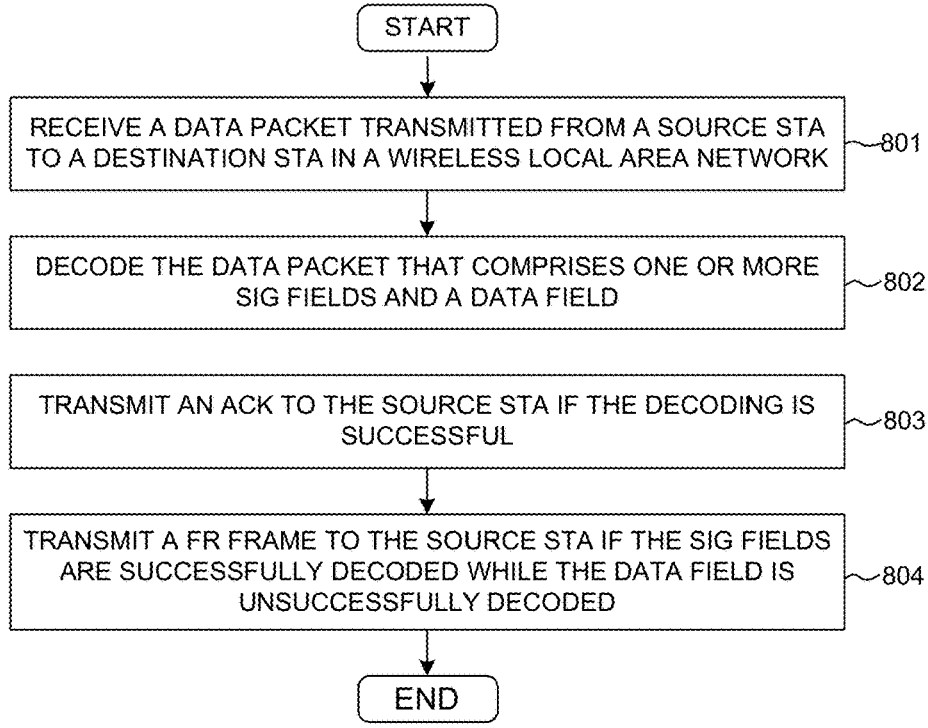
FIG. 8 is a flow chart of a method of transmitting reception failure feedback in a wireless local area network in accordance with one novel aspect.

FIG. 8 is a flow chart of a method of transmitting reception failure feedback in a wireless local area network in accordance with one novel aspect. In step 801, a destination STA receives a data packet transmitted from a source STA in a WLAN. In step 802, the destination STA decodes the data packet that comprises one or more SIG fields and a data field. In step 803, the destination STA transmits an ACK frame to the source STA if the decoding is successful. In step 804, the destination STA transmits a failure report (FR) frame to the source STA if the SIG fields are successfully decoded while the data field is unsuccessfully decoded (e.g., type-B failure reception). The FR frame is a control frame that includes a feedback field for type-B failure reception.

The feedback field in the FR control frame may include various feedback information to assist the source STA for re-transmission. First, the feedback field can include an SNR of the transmitted data packet that encounters a type-B reception failure. Second, the feedback field can include a recommended MCS for next re-transmission. Third, the feedback field can include Doppler Effect/channel variation metric, such as the request of traveling pilots or mid-amble, channel variation metric, etc. Fourth, the feedback field can include other metrics related to reception failure such as a collision indication due to interference.

Figure 9:
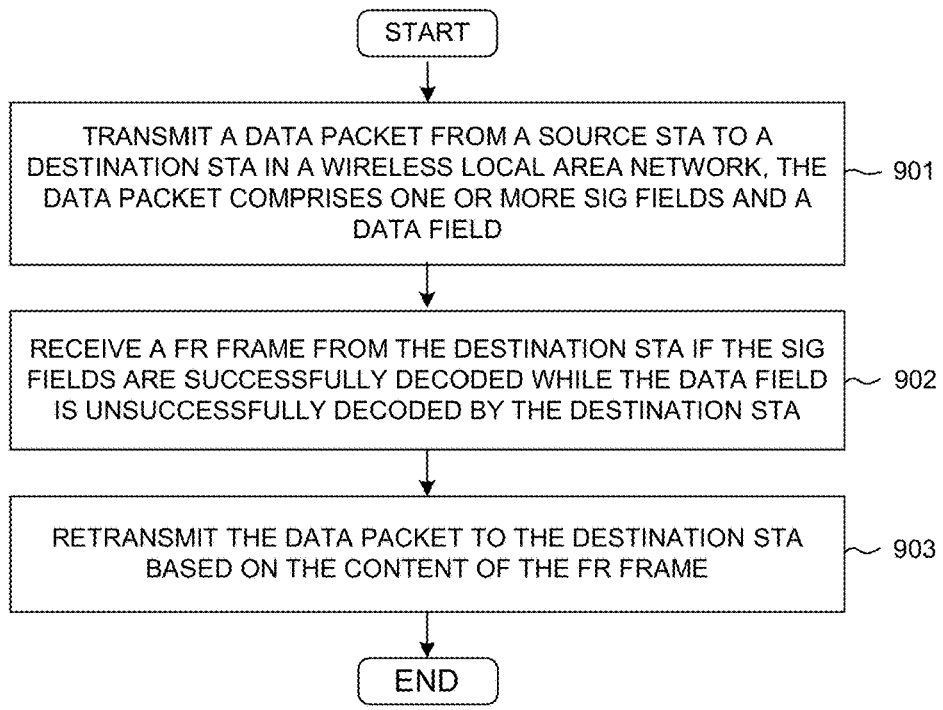
FIG. 9 is a flow chart of a method of receiving reception failure feedback in a wireless local area network in accordance with one novel aspect.

FIG. 9 is a flow chart of a method of receiving reception failure feedback in a wireless local area network in accordance with one novel aspect. In step 901, a source STA transmits a data packet to a destination STA in a WLAN. The data packet comprises one or more SIG fields and a data field. In step 902, the source STA receives a failure report (FR) frame from the destination STA if the SIG fields are successfully decoded while the data field is unsuccessfully decoded (e.g., type-B failure reception). In step 903, the source STA re-transmits the data packet to the destination STA based on the content of the FR frame if a type-B failure reception occurs.

If the source STA receives FR frame that includes SNR and/or recommended MCS, it adjusts its link adaptation based on the SNR and/or recommended MCS when it re-transmits the data packet. By accurate link adaption, the network efficiency is improved since the most conservation link adaption is avoided. If the source STA receives FR frame that includes Doppler Effect/channel variation metric, it can apply traveling pilots/mid-amble, or it can adjust the MCS or adjust the packet length in the re-transmission based on the Doppler Effect/channel variation metric. If the source STA receives FR frame that includes collision indication, it can defer its re-transmission a little bit longer to reduce the probability of a second collision.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving a data packet transmitted from a source station by a destination station in a wireless local area network;
   (b) decoding the data packet, wherein the data packet comprises one or more signaling (SIG) fields and a data field;
   (c) transmitting an acknowledgement to the source station if the decoding is successful; and
   (d) transmitting a failure report frame (FR frame) to the source station if the SIG fields are successfully decoded while the data field is unsuccessfully decoded, wherein the FR frame comprises a Doppler Effect or channel variation metric that indicates an average channel variation over a number of subcarriers and OFDM symbols occupied by the data packet for a predefine time period.

2. The method of claim 1, wherein the SIG field comprises a packet length of the data packet and a cyclic redundancy check (CRC) field.

3. The method of claim 2, wherein the FR frame is sent based on the decoded packet length followed by a short inter-frame space (SIFS).

4. The method of claim 2, wherein the SIG field further comprises a partial AID field, and wherein the destination station transmits the FR frame only if the partial AID identifies the destination station.

5. The method of claim 1, wherein the FR frame comprises a signal to noise ratio (SNR) and/or a signal to interference plus noise ratio (SINR) of the data packet.

6. The method of claim 1, wherein the FR frame comprises a recommended modulation and coding scheme (MCS) to the source station.

7. The method of claim 1, wherein the FR frame comprises a collision indication.

8. A wireless device comprising:
   a receiver that receives a data packet transmitted from a source station in a wireless local area network;
   a decoder that decodes the data packet, wherein the data packet comprises one or more signaling (SIG) fields and a data field; and
   a transmitter that transmits an acknowledgement to the source station if the decoding is successful, wherein the transmitter also transmits a failure report frame (FR frame) to the source station if the SIG fields are successfully decoded while the data field is unsuccessfully decoded, wherein the FR frame comprises a Doppler Effect or channel variation metric that indicates an average channel variation over a number of subcarriers and OFDM symbols occupied by the data packet for a predefine time period.

9. The device of claim 8, wherein the SIG field comprises a packet length of the data packet and a cyclic redundancy check (CRC) field.

10. The device of claim 9, wherein the FR frame is sent based on the decoded packet length followed by a short inter-frame space (SIFS).

11. The device of claim 9, wherein the SIG field further comprises a partial AID field, and wherein the destination station transmits the FR frame only if the partial AID identifies the destination station.

12. The device of claim 8, wherein the FR frame comprises a signal to noise ratio (SNR) and/or a signal to interference plus noise ratio (SINR) of the data packet.

13. The device of claim 8, wherein the FR frame comprises a recommended modulation and coding scheme (MCS) to the source station.

14. The device of claim 8, wherein the FR frame comprises a collision indication.

15. A method comprising:
   (a) transmitting a data packet transmitted from a source station to a destination station in a wireless local area network, wherein the data packet comprises one or more signaling (SIG) fields and a data field;
   (b) receiving a failure report frame (FR frame) from the destination station if the SIG fields are successfully decoded while the data field is unsuccessfully decoded by the destination station, wherein the FR frame comprises a Doppler Effect or channel variation metric that indicates an average channel variation over a number of subcarriers and OFDM symbols occupied by the data packet for a predefine time period; and
   (c) retransmitting the data packet to the destination station based on the content of the FR frame.

16. The method of claim 15, wherein the source station performs link adaptation in the retransmission based on a signal to noise ratio (SNR) and/or a recommended modulation and coding scheme (MCS) in the FR frame.

17. The method of claim 15, wherein the source station adjusts a modulation and coding scheme (MCS) in the retransmission based on the Doppler Effect/channel variation metric in the FR frame.

18. The method of claim 15, wherein the source station adjusts a packet length in the retransmission based on the Doppler Effect/channel variation metric in the FR frame.

\* \* \* \* \*